(12) United States Patent
Quero et al.

(10) Patent No.: US 7,239,521 B2
(45) Date of Patent: Jul. 3, 2007

(54) MODULE MOUNTING SYSTEM

(75) Inventors: Jose Quero, Freiberg (DE); Achim Stirner, Huttlingen (DE); Vassilios Tsirogiannis, Kirchheim/N (DE)

(73) Assignee: Trumpf Werkzeugmaschien GmbH + Co., KG, Ditzingen (DE)

( * ) Notice: Subject to any disclaimer, the term of this patent is extended or adjusted under 35 U.S.C. 154(b) by 0 days.

(21) Appl. No.: 10/876,770

(22) Filed: Jun. 28, 2004

(65) Prior Publication Data

US 2005/0077069 A1    Apr. 14, 2005

Related U.S. Application Data

(63) Continuation-in-part of application No. 10/429,239, filed on May 5, 2003.

(30) Foreign Application Priority Data

May 3, 2002   (EP) ................... 02009908
Jun. 26, 2003   (DE) ................ 103 28 708

(51) Int. Cl.
    *H05K 7/16* (2006.01)
(52) U.S. Cl. ...................... 361/725; 361/729
(58) Field of Classification Search ................ 361/601, 361/725, 729, 785, 812, 829
    See application file for complete search history.

(56) References Cited

U.S. PATENT DOCUMENTS 4,073,563 A    2/1978   Bailey et al.
4,672,511 A    6/1987   Meusel et al.
4,738,632 A    4/1988   Schmidt et al.
5,046,172 A    9/1991   Moreux et al.
5,068,778 A    11/1991  Kosem et al.
5,808,876 A    9/1998   Mullenbach et al.
6,456,495 B1   9/2002   Wieloch et al.
6,631,076 B2   10/2003  Behr et al.
6,654,255 B2 * 11/2003  Kruse et al. ................ 361/799
2002/0182933 A1 12/2002  Matsushita

FOREIGN PATENT DOCUMENTS

| CH | 554 084    | 9/1974 |
| DE | 195 30 925 | 2/1997 |
| DE | 197 43 974 | 4/1999 |
| DE | 199 48 329 | 5/2001 |
| DE | 201 19 837 | 5/2003 |
| FR | 2 601 546  | 1/1988 |
| GB | 2064225    | 6/1981 |

* cited by examiner

*Primary Examiner*—Hung V. Ngo
(74) *Attorney, Agent, or Firm*—Fish & Richardson P.C.

(57) ABSTRACT

A switch cabinet module mounting system includes a cabinet mounting panel and a plurality of electrically interconnected modules each separately replaceable and releasably attached to the mounting panel and configured to perform different functions. Each module includes a module base releasably attachable to the cabinet mounting panel, a first component mounting rail extending from the module base, and multiple electrical components secured to the component mounting rail, the electrical components of the module electrically interconnected to perform a specific function.

33 Claims, 11 Drawing Sheets

MODULE MOUNTING SYSTEM

CROSS-REFERENCE TO RELATED APPLICATIONS

This application is a continuation-in-part application of and claims priority to U.S. application Ser. No. 10/429,239, filed on May 5, 2003, which claims priority from European Patent Application Serial No. 02009908, filed May 3, 2002, the entire contents of which are hereby incorporated by reference. Additionally, this application claims priority under 35 USC § 119 German Patent Application Serial No. 10328708.4, filed on Jun. 26, 2003, the entire contents of which are hereby incorporated by reference.

TECHNICAL FIELD

The invention relates to switchgear cabinets for operating manufacturing machinery, and to methods of mounting electrical components in such cabinets.

BACKGROUND

Often a switch cabinet includes many electrical components that are necessary to supply and control various machines used in a plant. Typically, the electrical units located in a switch cabinet include power switches, power packs, input/output units, fuses, transformers, and terminals for access wiring and for intermediate and outgoing routing. The individual electrical components can be arranged in the switch cabinet such that several input/output units can be located in one area of the cabinet and power switches can be oriented in another area. The different components can then be wired together to provide the full functionality of the switch cabinet.

Installation of modules in a switch cabinet is described in U.S. Pat. No. 6,631,076, which illustrates and describes a switch cabinet that includes a switch cabinet box having several electrical functional modules. The modules are disposed onto a bearing rail that is disposed in the switch cabinet and has the shape of a hat and serves as module carrier. The individual modules are connected to the rail by contact tongues in the modules.

Data and power bus systems can be used for the wiring of individual modules and the connection of modular sensors, actuators, and also various input-output units. The switch cabinet can include functional, block-oriented modules necessary for powering and controlling a machine, and the modules can each perform a dedicated function.

SUMMARY

In a first general aspect, a switch cabinet module mounting system includes a cabinet mounting panel and a plurality of electrically interconnected modules each separately replaceable and releasably attached to the mounting panel and configured to perform different functions. Each module includes a module base releasably attachable to the cabinet mounting panel, a first component mounting rail extending from the module base, and multiple electrical components secured to the component mounting rail, the electrical components of the module electrically interconnected to perform a specific function.

The system can include one or more of the following features. For example, the system can further include an attachment means for releaseably attaching the module base to the cabinet mounting panel. The module base can consists substantially of a unitary sheet-metal structure, and the unitary sheet-metal structure can includes at least one attachment means for releasably attaching the sheet-metal structure to the mounting panel. The module base can include a sheet-metal structure, and the mounting rail can include a unitary extension of the sheet-metal structure, bent to extend away from the module base to form the mounting rail. The module base can include a face wall defining a recess for mounting an electrical connector therein.

The module base can include a sheet-metal structure defining a broad surface from which the mounting rail extends in a first direction, and side walls extending in an opposite direction to form a box defining an interior volume sized to accommodate wiring. The modules can be interconnected by multi-conductor cables releasably attached to the modules at corresponding electrical connectors. It is possible that each module includes no more than two such electrical connectors.

At least one of the modules is configured to drive a conveyor belt, to drive a motor for moving a processing head, or to supply power to a laser.

The mounting rail can be a C-shaped mounting rail. The system can include a second mounting rail for supporting components of the functional unit, wherein mounting rail is attached to the mounting base. The mounting plate can include a recess into which a plug of a component of the functional unit can be locked. The plug can include flexible connections having sections to overlap the module mounting plate. The system can further include a U-shaped clip that is adapted for plugging into the module base and for supporting a cable when plugged into the module base. The system can further include a clamp having an adjustable clamping plate, and the clamp can be adapted for plugging into the cabinet mounting panel.

In another general aspect, a switch cabinet can include a cabinet mounting panel adapted for receiving a plurality of electrical functional units, a first module base adapted for receiving a first electrical functional unit and adapted for attachment to the cabinet mounting panel, a second module base adapted for receiving a second electrical functional unit and adapted for attachment to the cabinet mounting panel, and a bus for electrically connecting the first electrical functional unit and the second electrical functional unit. The first module base includes a first mounting plate that carries a first mounting rail for supporting components of the first functional unit, and the second module base includes a second mounting plate that carries a second mounting rail for supporting components of the second functional unit.

The switch cabinet can include one or more of the following features. For example, the first mounting rail can be a C-shaped mounting rail. The first module base can further include a third mounting rail carried by the first mounting plate, located opposite the first mounting rail for supporting components of the first functional unit.

The first mounting rail can be integrated with the first mounting plate and the second mounting rail can be integrated with the second mounting plate. The first mounting rail and first mounting plate can be formed of a unitary structure, and the second mounting rail and the second mounting plate can be formed of a unitary structure. The first module base can further include a third mounting rail integrated with the first mounting plate, located opposite the first mounting rail for supporting components of the first functional unit. The first and third mounting rails and the first mounting plate can be formed of a unitary structure, and the second mounting rail and the second mounting plate can be formed of a unitary structure. The first mounting rail and the first mounting plate can be formed of a unitary structure and wherein the second mounting rail and the second mounting plate are formed of a unitary structure.

The first mounting plate can include a recess into which a plug of a component of the first functional unit can be locked. The plug can include flexible connections having sections to overlap the first module mounting plate. The system can further include a U-shaped clip that is adapted for plugging into the first module base and for supporting a cable when plugged into the first module base. The system can further include a clamp having an adjustable clamping plate, wherein the clamp is adapted for plugging into the cabinet mounting panel.

In some embodiments the module base has at least a single mounting rail cut from a module mounting plate, and the module mounting plate is trimmed to mount components of the functional module. The mounted modules are installed in a switch cabinet and connected by a multipolar bus suited for transmitting energy and data.

The mounting rail can be C-shaped to allow the clamping of the components of a functional unit to the rail. Two mounting rails may be arranged to face each other for the attachment of the components of the functional unit.

A quick installation and/or dismantling of plugs, specifically two-way adapters, is achieved, if the module mounting plate of the module mountings has a recess to plug in and lock a plug. The locking mechanism of such a clip mechanism may be arranged so that the plug has flexible connections with sections to overlap the module mounting plate. A clip to plug into the module mounting assists in providing a clear cable routing. The clip acts as a support, through which the cables, data lines or power supply lines may be installed, and loosely hanging cables or lines on the mounting plate can be eliminated.

A clamp with an adjustable clamping plate to plug into the mounting plate is provided as strain relief for the cables, data lines, or power supply lines.

The module mounting system disclosed herein can facilitate automatic module production, reduce the mounting hours for switch cabinet construction, reduce the construction time for new projects, reduce the processing times of the switch cabinet, permit free selection of variants for final mounting to reduce unnecessary parts, and provide simple and secure mounting of structural parts and construction units (easy maintenance), centralized and decentralized construction with the same modules and simple reconfiguration to different machine requirements.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
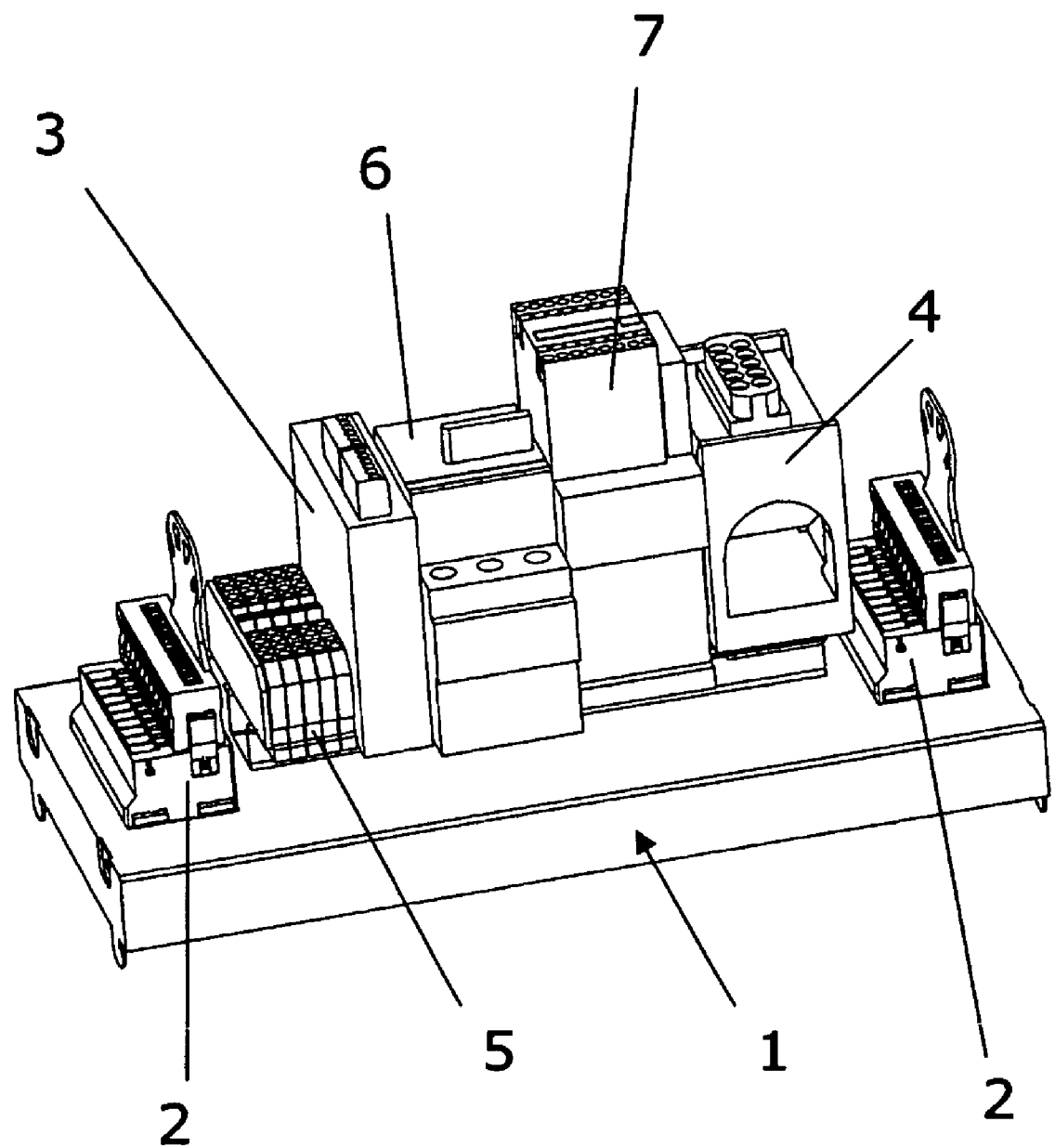
FIG. 1 is a perspective view of a representative module.

As illustrated in FIG. 1, components for control and regulation of an energy or power supply of an electricity consumer (e.g., a motor, a radio-frequency generator, a valve, or a heating element) can be housed as a functional unit on a module mounting 1, which is, for example, made out of sheet metal. A functional unit is a self-contained unit that can perform a particular function within the power supply. For example, a functional unit can be a self-contained unit for supplying a particular voltage and current, a temperature interlock, a remote programming interface, or for performing other high-order energy supply and control functions, such as, for example, for controlling a conveyor belt, for powering laser, for moving a processing head, and for receiving and analyzing data from a sensor. Other functional units can serve for control of a servo drive, a right-left-drive, a voltage supply, a bus switch (gateway), etc. Different functional units can be combined in a control switch cabinet to create a controller to meet a particular customer's needs, particularly in the control of plant machining, such as metal cutting, punching, stamping, and welding. Such a controller can be housed in a switch cabinet.

This modular control cabinet concept facilitates a function-oriented structure for planning and configuring in electrical, mechanical, and plant engineering. A control cabinet can be installed with pre-assembled and tested modules using a "Plug and Play" principle and can be linked with standard cables. If a fault to a module occurs, the defective module in the control cabinet can be quickly identified and replaced by a functional module in the control cabinet without the need for time-consuming activities. Because a customer can replace the defective module, for example with a spare module kept at the customer site, or with a module shipped overnight by the manufacturer, the customer's downtime is minimized compared to a customer using a switch cabinet that contains many basic electrical components (e.g., resistors, capacitors, relays) that together perform all the functions of the switch cabinet but that are not organized into separately replaceable modules, each corresponding to higher-order functions of a particular machine.

The functional unit can include a network board, a protective switch, a switch, a terminal, and a bus interface. The network board can serve as a software and hardware interface for coupling the functional unit to a central control of the electricity consumer. The protective switch can prevent overload of the unit or of the electricity consumer. The electricity consumer can be switched on or off by means of the switch or contactor. The electricity consumer can be connected to an energy/power supply by a terminal realized through plug contacts. The connection of the functional unit to one or more other functional units can be achieved by the bus interface.

Figure 2:
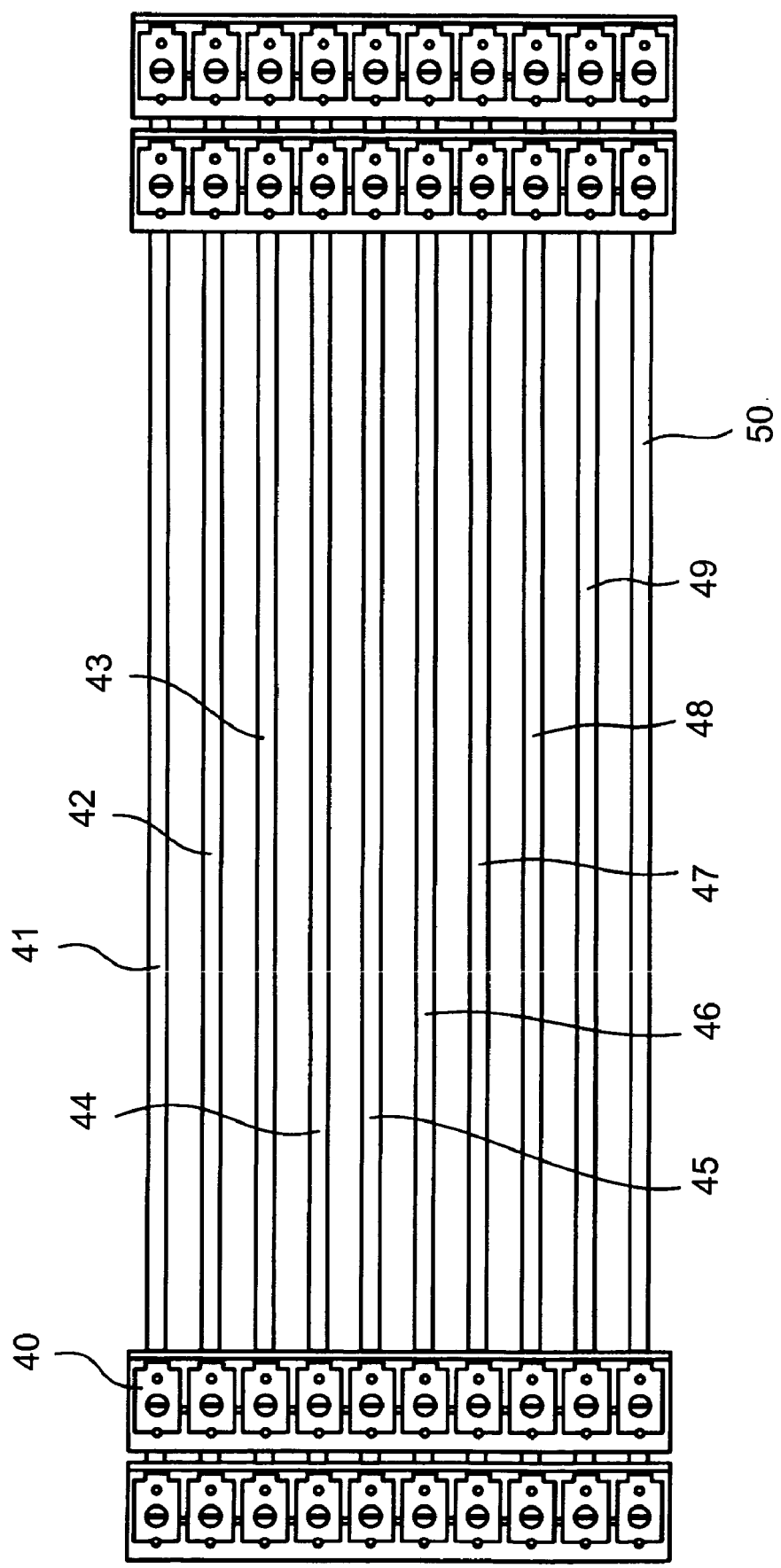
FIG. 2 is a schematic view of energy and data lines for a module.
Figure 3:
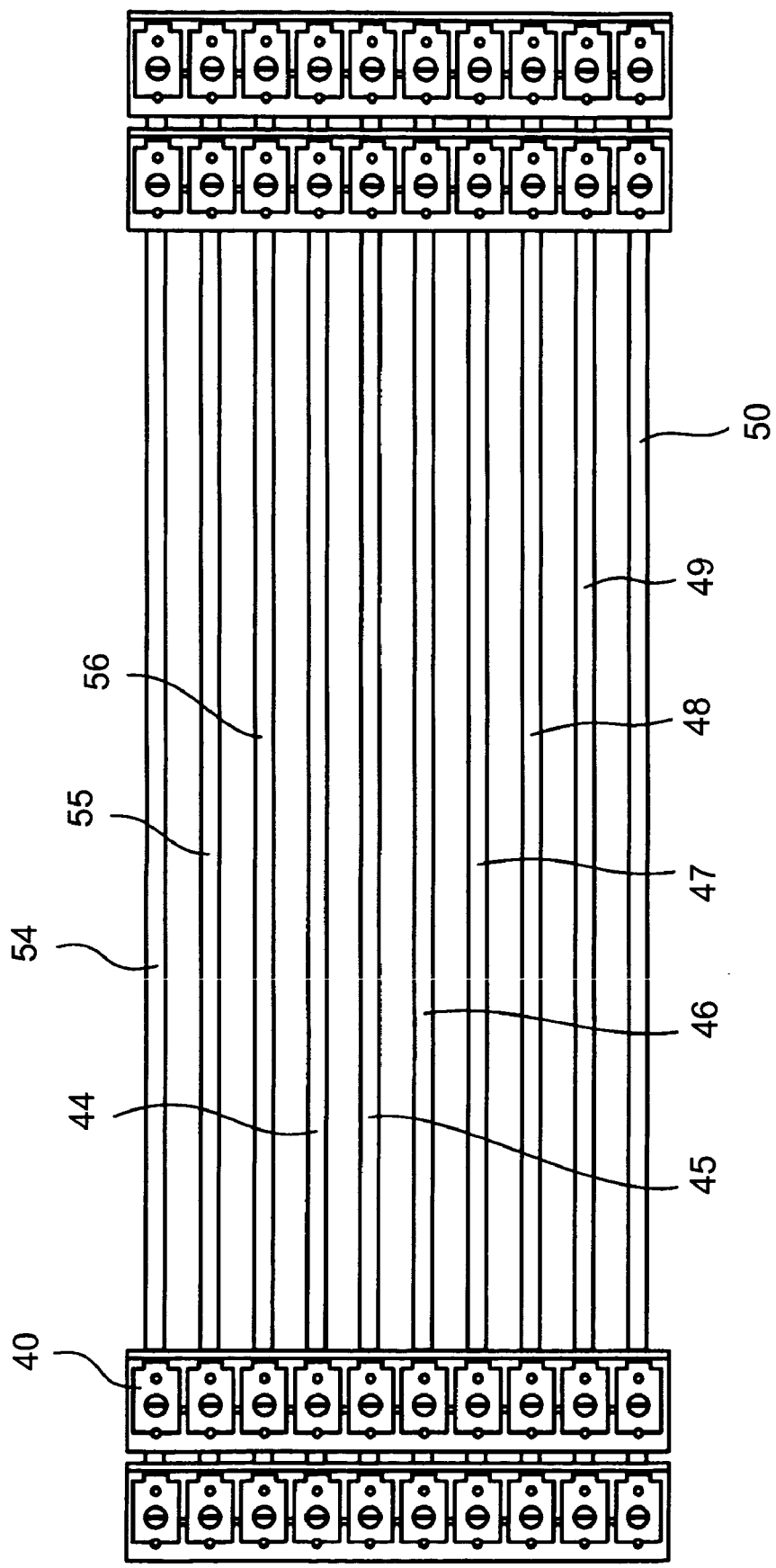
FIG. 3 is a schematic view of a second arrangement of energy and data lines of a module.

Each unit has interfaces for coupling to a central control unit or to further functional units. Two rows of plug contacts 40 each are provided on each side of the unit. FIG. 2 shows three energy transmission lines 41, 42, and 43 and a protective conductor 44 for rotary current to drive, e.g., a motor. Lines 45 (24 V DC) and 46 (0 V DC) permanently supply energy to an electricity consumer, such as a light or a valve, while 24 V DC or 0 V DC are present at the lines 47 and 48 only with corresponding circuit. In contrast to the implementation shown in FIG. 2, FIG. 3 concerns an implementation for alternating current with a line 54 for 230 V AC and an alternative line 56 for 115 V AC and a common zero conductor 55. Each embodiment has additional data lines 49 and 50.

Figure 4:
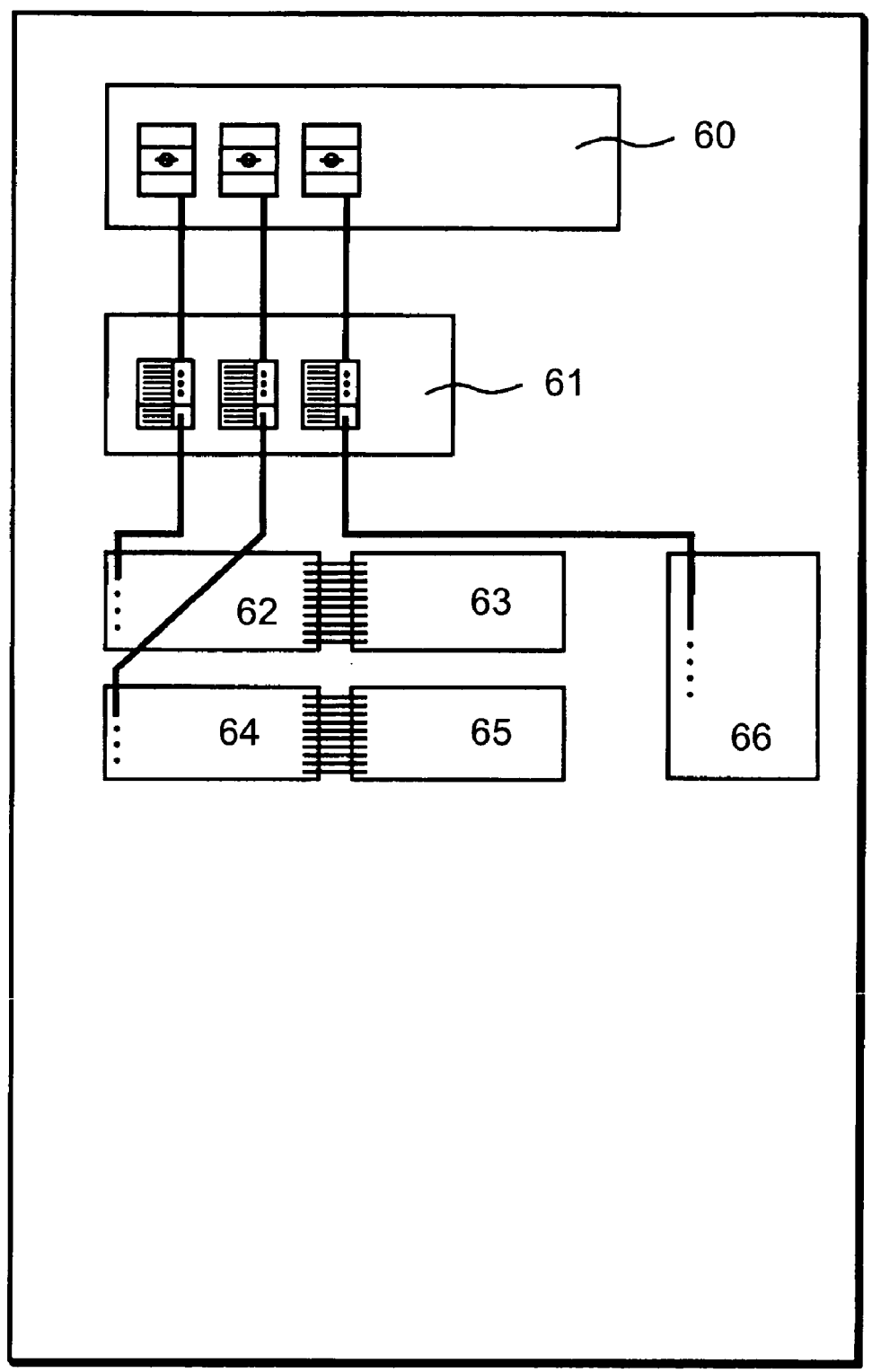
FIG. 4 is a schematic view of an arrangement and connection of selected modules on a switch cabinet wall.

Ash shown in FIG. 4, for construction of a switch cabinet for a plant or machine, pre-fabricated modules 60–66, which perform different individual functions are installed in the switch cabinet. After combination of the modules 60–66, described in detail above, in accordance with parameterization, the modules 60–66 are positioned and electrically connected by the energy and data bus.

Referring again to FIG. 1, several individual components of the functional unit (e.g., a two-way adapter 2, input and output components 3 and 4, terminals 5, and switches 6 and 7) can be housed on the module base 1. Similar to this functional unit, any number of additional functional units may be premounted on the module base. The functional unit and the module base 1 are a part of a module and construction kit system that can include a plurality of these generic functional units. The generic functional units are assembled from standard electrical components and are not specific to the controller in which they are located, but, rather, they are functional units that can be plugged into a controller to provide a self-contained structure for performing a particular function within the controller. Thus, multiple functional units can be created and housed on the module bases 1. The functional units are created in accordance with a functional module and module mounting 2 system, such that the modules may be plugged into, detected, controlled and combined with other components in a control cabinet using a "plug and play" method.

Figure 5:
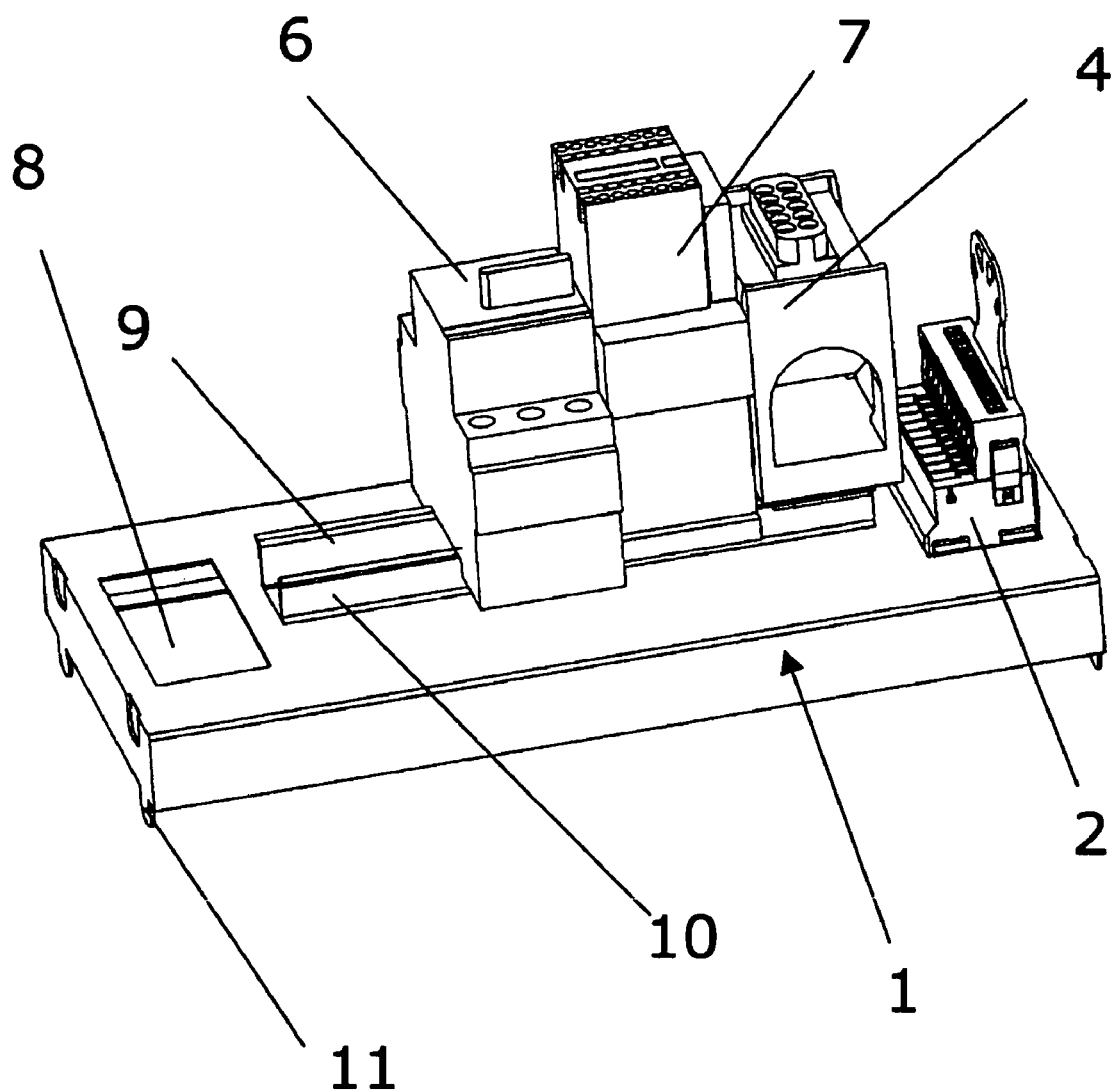
FIG. 5 is a perspective view of the module of FIG. 1 with several module elements removed.

FIG. 5 shows how the module base 1 is constructed. The one-part module base 1 is produced of sheet metal by cutting and trimming and has a recess 8 to plug in and locate two-way adapters 2 or 4 by locking. For clarity, terminals 5 and one two-way adapter 2 are not illustrated in FIG. 2. It can be seen that module base 1 has two C-shaped mounting rails 9 and 10. Mounting rails 9 and 10, for example, may be cut, trimmed and bent upward or set up from the sheet metal. Mounting rails 9 and 10 serve to maintain the components in the functional module.

Figure 6:
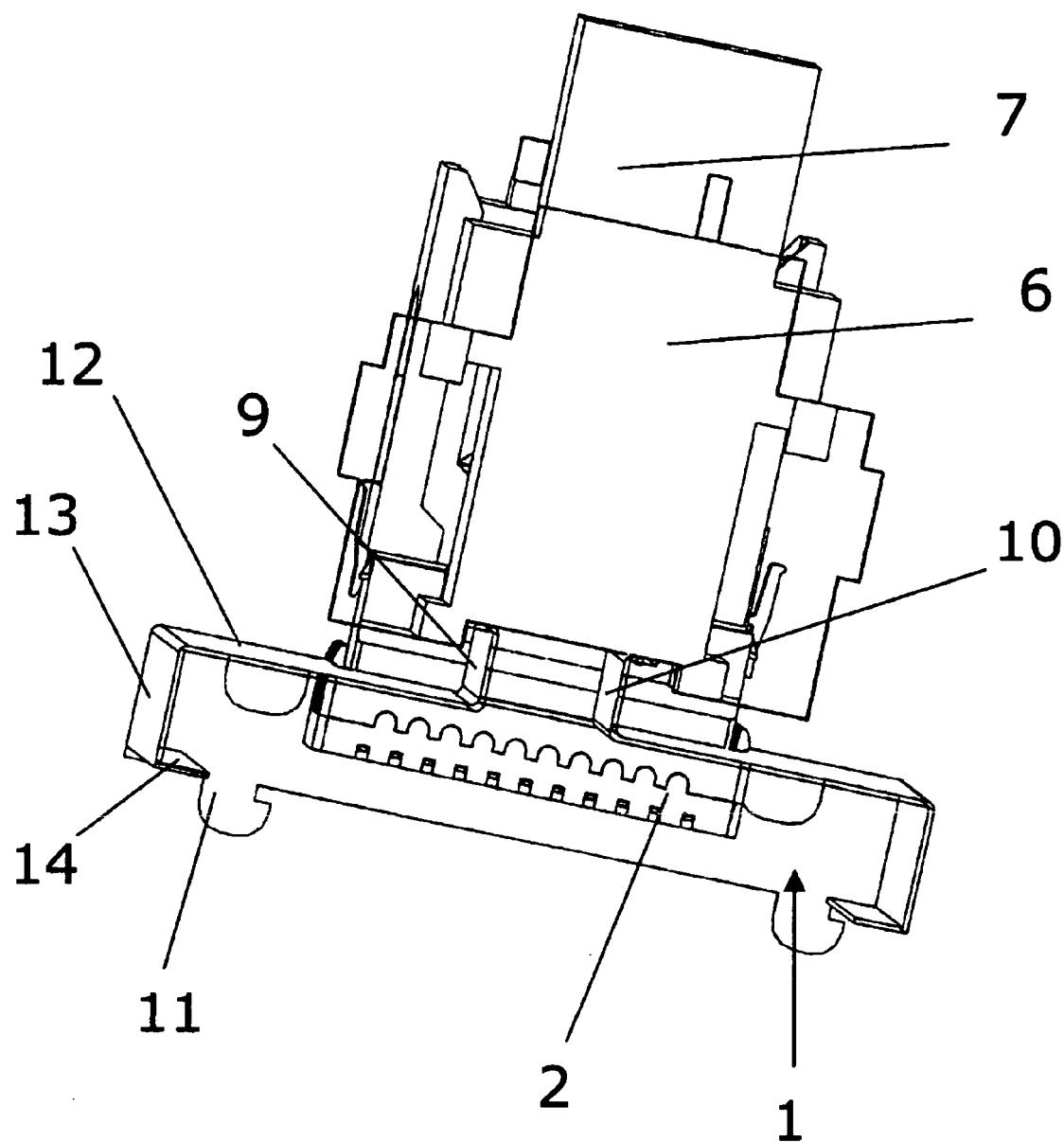
FIG. 6 is an end view of the module of FIG. 1.

The arrangement of mounting rails 9 and 10 is again illustrated by the cross-sectional view in FIG. 6. FIGS. 5 and 6 also illustrate the L-shaped fishplates 11 used to attach module base 1 to a switch cabinet panel. The module base 1 can also be attached to the switch cabinet panel in other ways, for example, one or more clips, hooks, brackets, magnets, tongue-and-groove fasteners, threaded fasteners, releasable fasteners. Each corner of module base 1 has a related fishplate 11. FIG. 6 also shows that module base 1 includes a module mounting plate 12 bent to form side walls 13 and lower walls 14, so that a hollow space of the module base 1 is created that is open below and that is available to house data and power supply lines.

Figure 7:
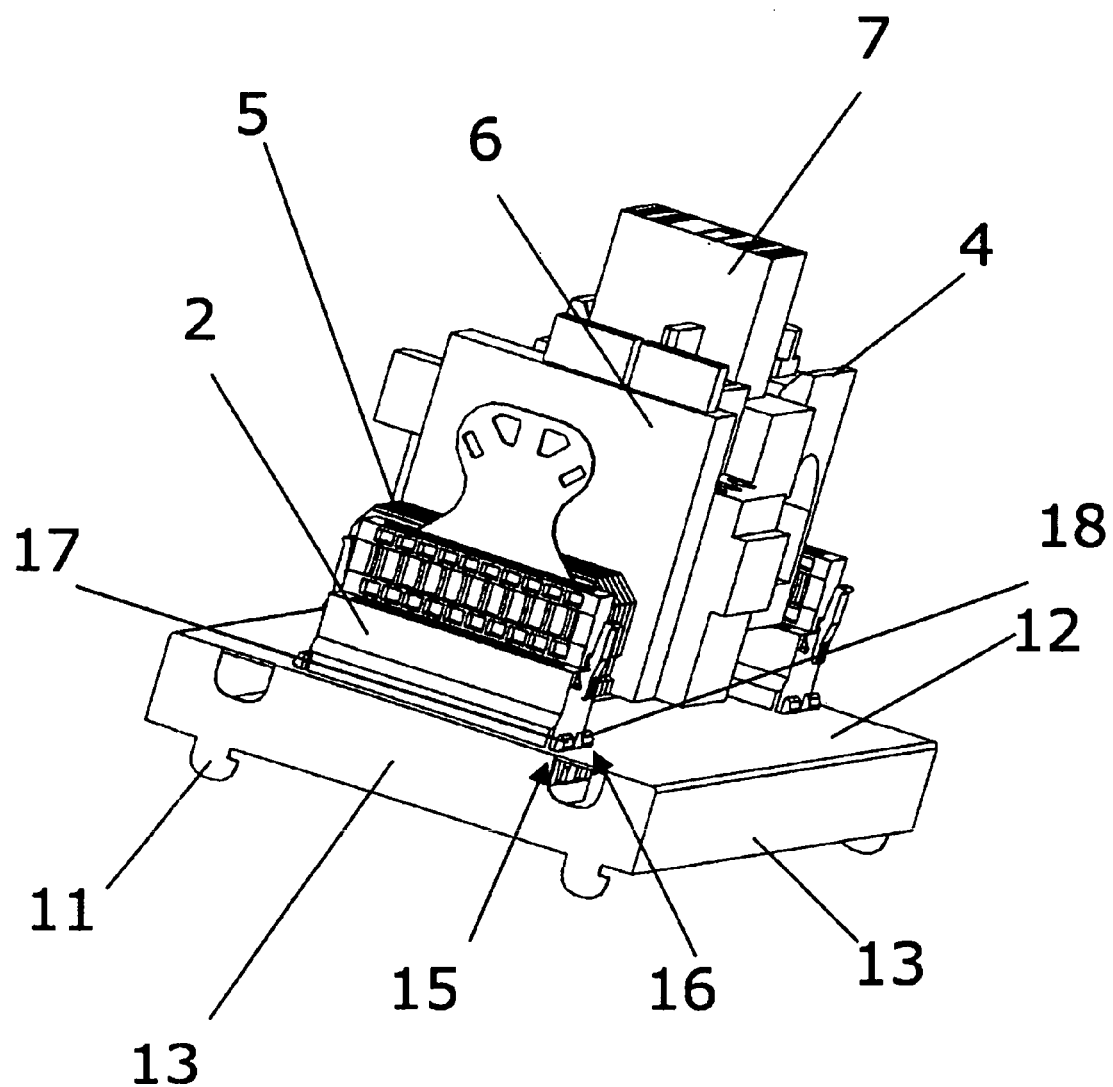
FIG. 7 is a view of a transverse side of the module of FIG. 1.
Figure 8:
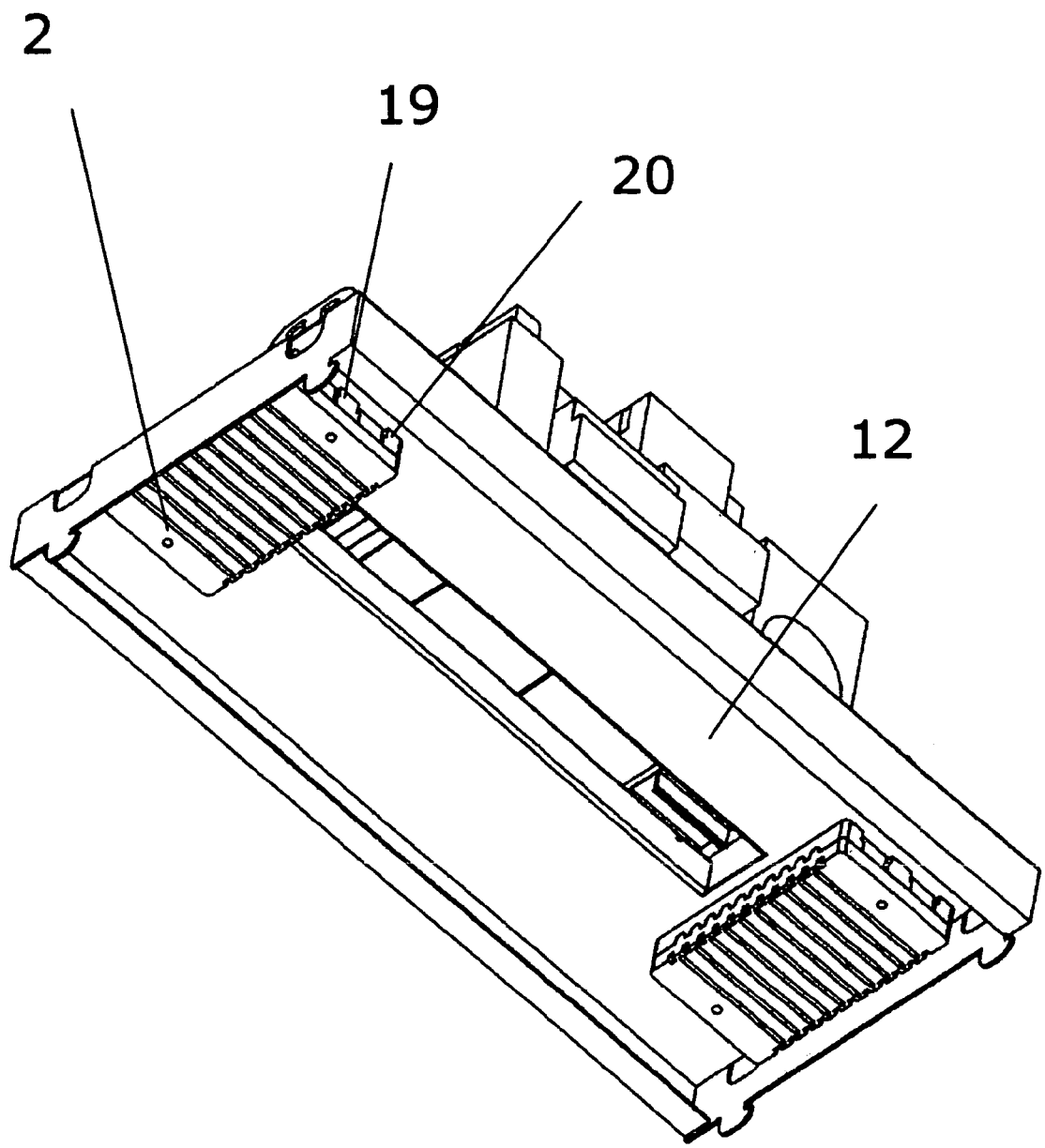
FIG. 8 is a view of the lower surface of the module of FIG. 1.

The line cover is shown in FIG. 7, which also shows that the two-way adapter 2 includes flexible connections 15 and 16 arranged on two opposing sides, in the direction of the lateral margin of module mounting plate 12. Connections 15 and 16 overlap the module mounting plate 12, so that the module mounting plate 12 is clamped between sections 17 and 18 of connections 15 and 16 above the module mounting plate 12 and locks 19 and 20 of the two-way adapter 2 below the module mounting plate 12 (as shown in FIG. 8). Sections 17 and 18 are pushed laterally inward over their angular faces when the two-way adapter 2 is plugged into the module mounting plate 12 from below and finally overlap module mounting plate 12 flexibly.

Figure 9:
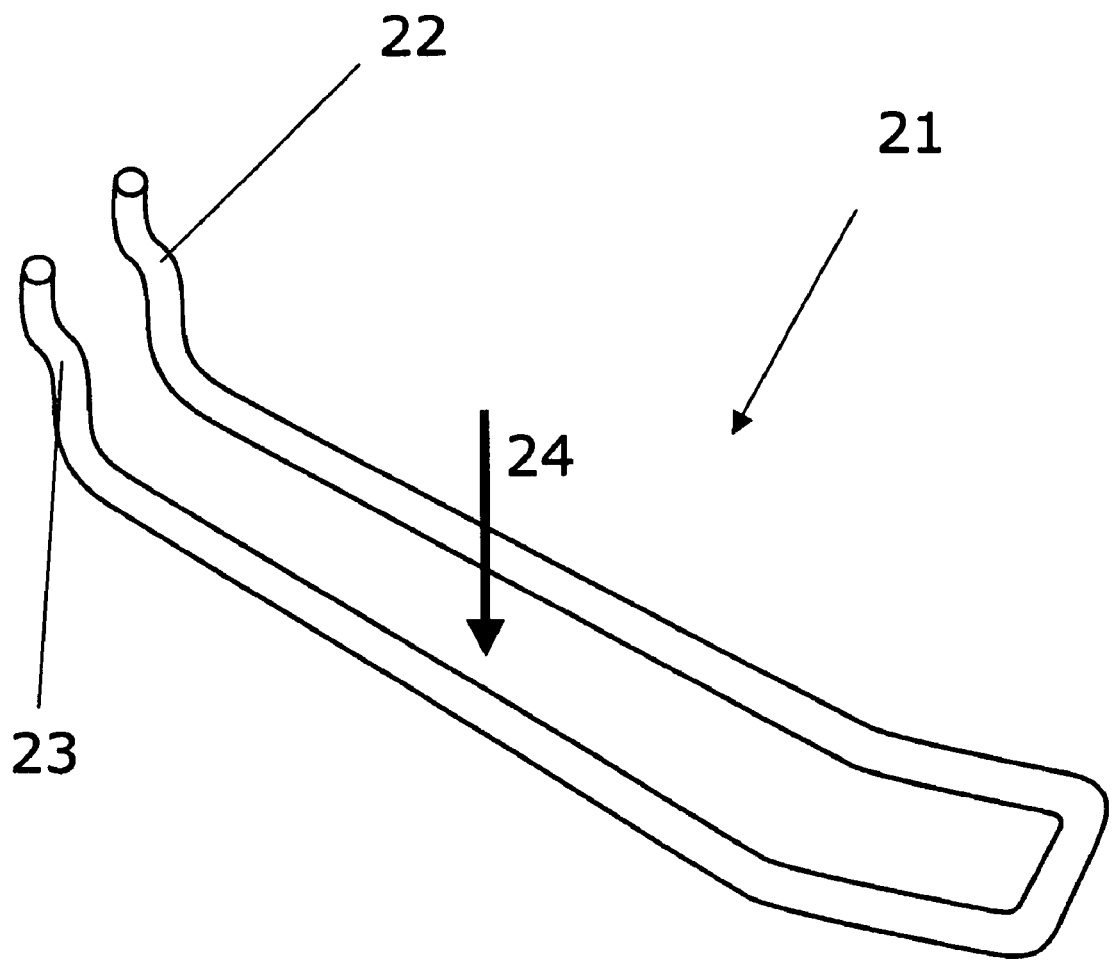
FIG. 9 is a perspective view of a clip to insert into the base of the module of FIG. 1.

A U-shaped clip 21, as illustrated by FIG. 9, acts as a support for a cable or a cable harness when plugged in, or attached to, the module base 1. Open ends 22 and 23 may be inserted in holes of the module base, so that ends 22 and 23 are supported and anchored on the module base based on the slightly S-shaped design of clip 21 in arrow direction 24. Clip 21 may provide a clear cable routing along the control cabinet panel.

Figure 10:
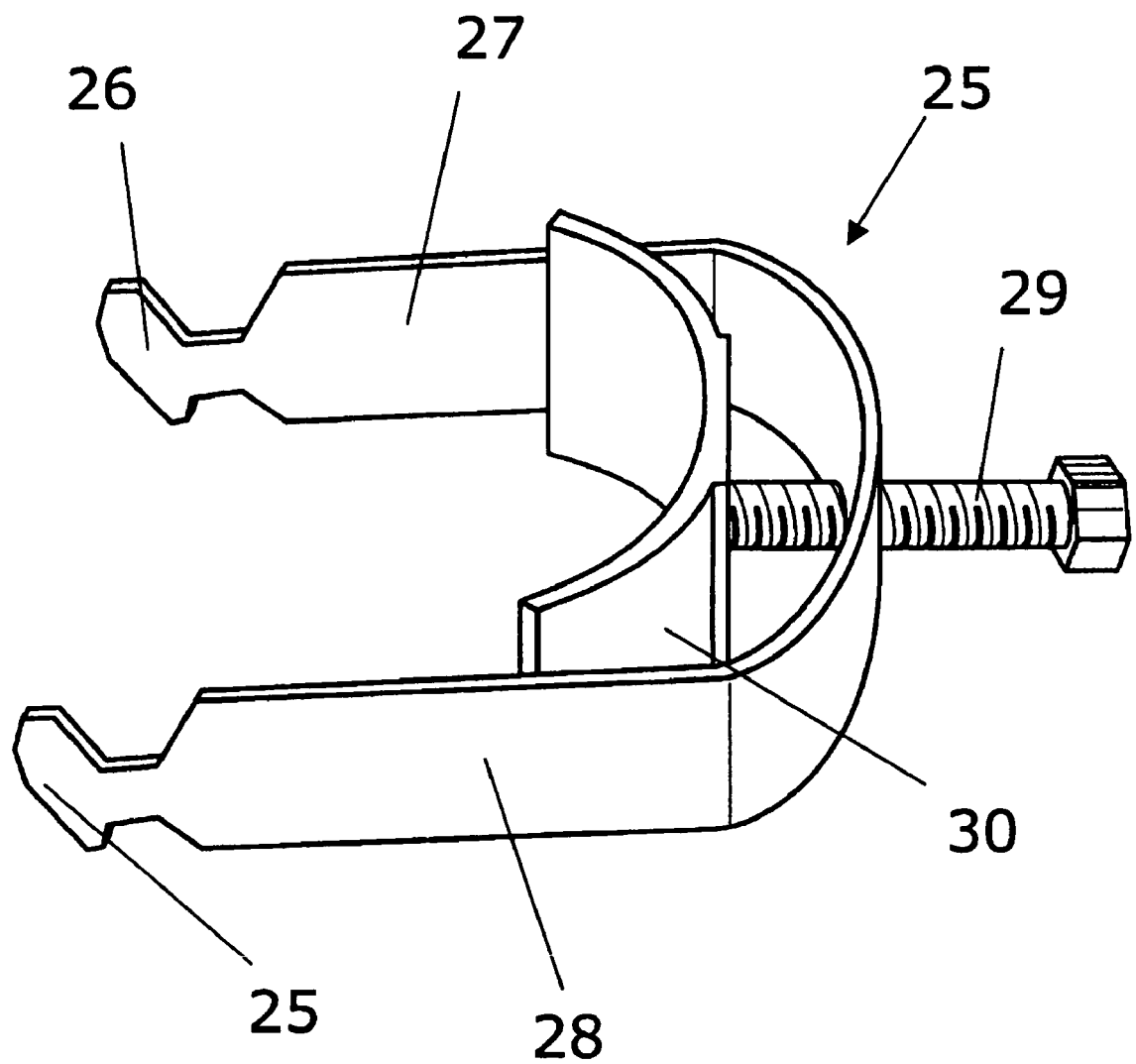
FIG. 10 is a perspective view of a terminal for the installation into the cabinet panel of figure 11.

A clamp 25, as illustrated in FIG. 10, can be attached into the appropriate holes of the control cabinet panel by its T-shaped shank ends 25 and 26. A clamp plate 30 is arranged between shanks 27 and 28 and is adjustable through an adjusting screw 29. A cable or a cable harness may be attached between the control cabinet panel and shanks 27 and 28, as well as the adjusting screw 29, to relieve strain.

Figure 11:
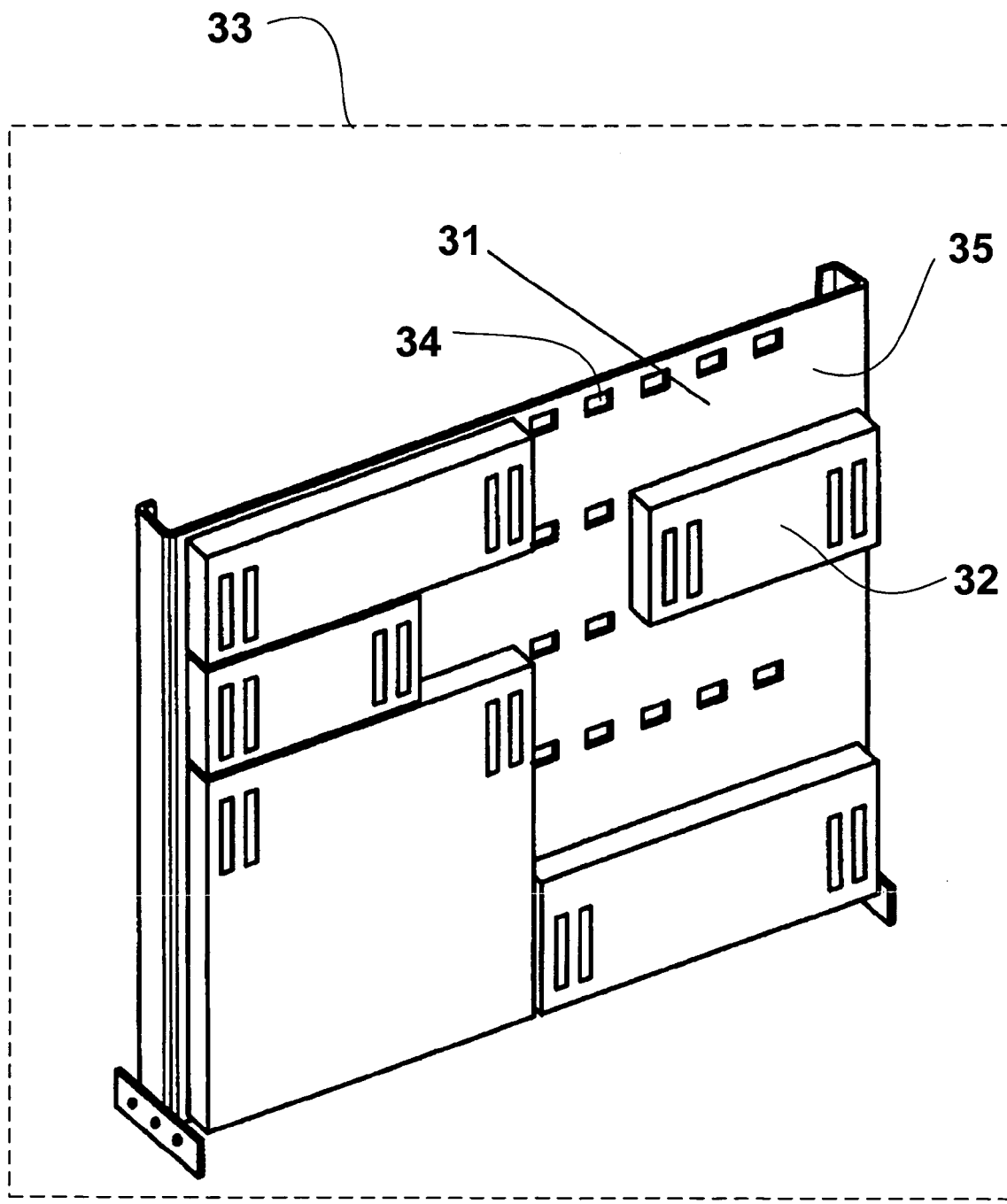
FIG. 11 is a perspective view of a cabinet panel.

FIG. 11 shows how modules 32 that are used in the functional units may be attached to a conventional control switch cabinet housing 33. Fishplates are used to plug the modules on a module base 1 into recesses or holes 34 of a sheet metal quick mounting plate 35 that is integrated into a cabinet panel 31. A coupling of the functional modular units occurs via interfaces and connecting cables of a bus system. Cabinet panel 31 includes a plurality of such recesses to position the module base 1, the clip, and the terminals differently and/or to attach additional module bases 1 with other functional units. The module base 1 that is installed is exchangeable and removable with the aid of an attachment screw, or a latch may also be attached to the cabinet panel.

A number of implementations have been described. Nevertheless, it will be understood that various modifications may be made. Accordingly, other implementations are within the scope of the following claims.

What is claimed is:

1. A plant machinery controller comprising:
   a cabinet mounting panel; and
   a plurality of electrically interconnected modules each separately replaceable and releasably attached to the mounting panel and to perform different functions, each module comprising:
      a module base releasably attachable to the cabinet mounting panel,
      a first component mounting rail extending from the module base, and
      multiple electrical components secured to the component mounting rail,
   the electrical components of the module electrically interconnected to perform a specific function,
   wherein each module includes an interface to connect the modules to a common bus providing both electrical power and data connection between the various modules secured to the mounting panel.

2. The plant machinery controller of claim 1, further comprising an attachment means for releaseably attaching the module base to the cabinet mounting panel.

3. The plant machinery controller of claim 1, wherein the module base consists substantially of a unitary sheet-metal structure.

4. The plant machinery controller of claim 3, wherein the unitary sheet-metal structure includes at least one attachment means for releasably attaching the sheet-metal structure to the mounting panel.

5. The plant machinery controller of claim 1, wherein the module base comprises a sheet-metal structure and wherein the mounting rail comprises a unitary extension of the sheet-metal structure, bent to extend away from the module base to form the mounting rail.

6. The plant machinery controller of claim 5, wherein the module base comprises a face wall defining a recess for mounting an electrical connector therein.

7. The plant machinery controller of claim 1, wherein the module base comprises a sheet-metal structure defining a broad surface from which the mounting rail extends in a first direction, and side walls extending in an opposite direction to form a box defining an interior volume sized to accommodate wiring.

8. The plant machinery controller of claim 1, wherein the modules are interconnected by multi-conductor cables releasably attached to the modules at corresponding electrical connectors.

9. The plant machinery controller of claim 8, wherein each module comprises no more than two such electrical connectors.

10. The plant machinery controller of claim 1, wherein at least one of the modules is configured to drive a conveyor belt.

11. The plant machinery controller of claim 1, wherein at least one of the modules is configured to drive a motor for moving a processing head.

12. The plant machinery controller of claim 1, wherein at least one of the modules is configured to supply power to a laser.

13. The plant machinery controller of claim 1, wherein the mounting rail is a C-shaped mounting rail.

14. The plant machinery controller of claim 1, further comprising a second mounting rail for supporting components of the functional unit, wherein mounting rail is attached to the mounting base.

15. The plant machinery controller of claim 1, wherein the mounting panel includes a recess into which a plug of a component of the functional unit can be locked.

16. The plant machinery controller of claim 15, wherein the plug includes flexible connections having sections to overlap the mounting panel.

17. The plant machinery controller of claim 1, further comprising a U-shaped clip that is adapted for plugging into the module base and for supporting a cable when plugged into the module base.

18. The plant machinery controller of claim 1, further comprising a clamp having an adjustable clamping plate, wherein the clamp is adapted for plugging into the cabinet mounting panel.

19. The plant machinery controller of claim 1, further comprising a network board to couple the modules to a central control of the plant.

20. The plant machinery controller of claim 1, wherein the cabinet mounting panel defines a two-dimensional array of module mounting points, such that the modules are mountable in multiple, selectable locations across the two-dimensional array and independent of module function.

21. The plant machinery controller of claim 1, wherein the modules comprise at least one of a protective switch, a terminal, a bus interface a servo drive control, a right-left drive, a voltage supply, and a bus switch.

22. A plant machinery controller comprising:
a cabinet mounting panel adapted for receiving a plurality of electrical functional units;
a first module base adapted for receiving a first electrical functional unit and adapted for attachment to the cabinet mounting panel, wherein the first module base includes a first mounting plate that carries a first mounting rail for supporting components of the first functional unit;
a second module base adapted for receiving a second electrical functional unit and adapted for attachment to the cabinet mounting panel, wherein the second module base includes a second mounting plate that carries a second mounting rail for supporting components of the second functional unit; and
a bus providing both electrical power and data connection between the first electrical functional unit and the second electrical functional unit.

23. The plant machinery controller of claim 22, wherein the first mounting rail is a C-shaped mounting rail.

24. The plant machinery controller of claim 22, wherein the first module base further includes a third mounting rail carried by the first mounting plate, located opposite the first mounting rail for supporting components of the first functional unit.

25. The plant machinery controller of claim 22, wherein the first mounting rail is integrated with the first mounting plate and the second mounting rail is integrated with the second mounting plate.

26. The plant machinery controller of claim 25, wherein the first module base further includes a third mounting rail integrated with the first mounting plate, located opposite the first mounting rail for supporting components of the first functional unit.

27. The plant machinery controller of claim 26, wherein the first and third mounting rails and the first mounting plate are formed of a unitary structure and wherein the second mounting rail and the second mounting plate are formed of a unitary structure.

28. The plant machinery controller of claim 22, wherein the first mounting rail and first mounting plate are formed of a unitary structure and wherein the second mounting rail and the second mounting plate are formed of a unitary structure.

29. The plant machinery controller of claim 22, wherein the first mounting rail and first mounting plate are formed of a unitary structure and wherein the second mounting rail and the second mounting plate are formed of a unitary structure.

30. The plant machinery controller of claim 22, wherein the first mounting plate includes a recess into which a plug of a component of the first functional unit can be locked.

31. The plant machinery controller of claim 30, wherein the plug includes flexible connections having sections to overlap the first module mounting plate.

32. The plant machinery controller of claim 22, further comprising a U-shaped clip that is adapted for plugging into the first module base and for supporting a cable when plugged into the first module base.

33. The plant machinery controller of claim 22, further comprising a clamp having an adjustable clamping plate, wherein the clamp is adapted for plugging into the cabinet mounting panel.

* * * * *